United States Patent [19]

Diffenderfer

[11] Patent Number: 4,669,737

[45] Date of Patent: Jun. 2, 1987

[54] ANNULAR SHAFT SEAL WITH CAM PORTION ON SEALING LIP

[75] Inventor: Harold R. Diffenderfer, Pottstown, Pa.

[73] Assignee: Neapco, Inc., Pottstown, Pa.

[21] Appl. No.: 900,537

[22] Filed: Aug. 26, 1986

[51] Int. Cl.⁴ .......................... F16J 15/32; F16D 3/84
[52] U.S. Cl. .......................................... 277/9; 277/12; 277/30; 277/152; 277/1; 464/133
[58] Field of Search ...................... 277/12, 30, 31, 32, 277/152, 153, 1, 9, 9.5; 464/133

[56] References Cited

U.S. PATENT DOCUMENTS

| | | | |
|---|---|---|---|
| 2,181,203 | 11/1939 | Reynolds . | |
| 3,235,271 | 2/1966 | Johnson et al. | 277/47 |
| 3,346,265 | 10/1967 | Rhoads et al. | 277/152 |
| 3,545,770 | 12/1970 | Wheelock | 277/152 |
| 3,591,963 | 7/1971 | Kopp | 277/29 |
| 3,813,104 | 5/1974 | Smith | 277/94 |
| 3,825,271 | 7/1974 | Bellastio | 277/34.3 |
| 3,940,948 | 3/1976 | Schultenkamper | 464/133 X |
| 3,947,944 | 4/1976 | Washington | 277/1 |
| 4,114,897 | 9/1978 | Bainard | 277/152 X |
| 4,126,317 | 11/1978 | Bainard | 277/9.5 |
| 4,131,286 | 12/1978 | Bainard | 277/152 |
| 4,215,869 | 8/1980 | Pendleton | 277/215 |

FOREIGN PATENT DOCUMENTS

| | | | |
|---|---|---|---|
| 47-15083 | 5/1972 | Japan | 277/152 |
| 934104 | 6/1982 | U.S.S.R. | 277/152 |

Primary Examiner—Robert S. Ward
Attorney, Agent, or Firm—Woodcock Washburn Kurtz Mackiewicz & Norris

[57] ABSTRACT

An annular shaft seal to be moved over a first, larger diameter portion of a shaft and to seal against a second, smaller, diameter portion of the shaft. The shaft seal comprises a mounting portion, a sealing lip portion and a flexible channel-shaped portion interconnecting the mounting portion and the sealing lip portion. The sealing lip portion has a primary sealing lip and a secondary sealing lip disposed adjacent to and spaced axially from the primary sealing lip in a direction away from the mounting portion. The sealing lip portion is movable with respect to the mounting portion from the sealing profile in which the primary sealing lip has a smaller diameter than the secondary sealing lip and is adapted to be in sealing contact with the second portion of the shaft, to a non-sealing profile in which the diameter of the primary sealing lip is larger than that of the secondary sealing lip, and in which the secondary sealing lip engages the larger diameter portion of the shaft thereby distending the primary sealing lip to its larger diameter condition such that the primary sealing lip cannot contact either portion of the shaft when the seal is being installed on the shaft. The primary sealing lip is maintained out of contact with the first portion of the shaft during installation and after installation the sealing lip portion without reversal thereof automatically returns from non-sealing profile back to sealing profile whereby the primary sealing lip automatically moves into sealing contact with the second portion of the shaft after the secondary sealing lip has been moved over and beyond the first portion of the shaft to engage the second portion of the shaft.

13 Claims, 5 Drawing Figures

4,669,737

ANNULAR SHAFT SEAL WITH CAM PORTION ON SEALING LIP

BACKGROUND OF THE INVENTION

The invention relates to annular shaft seals and particularly those of the type that during installation must be moved over a first, larger diameter portion of the shaft for sealing against a second, smaller diameter portion of the shaft.

Shafts of the foregoing type frequently have splined areas which have a larger diameter than the adjacent smooth surface of smaller diameter against which the seal is created. Shafts of this type are used in connection with yokes for motor vehicles and other applications. Heretofore the seals have been made with a split cork gasket compressed by a screw cap. More recent prior art seals have used elastomeric seals such as shown in U.S. Pat. Nos. 4,114,897 and 4,126,317. In those patents it was necessary to hold the sealing lip in a non-sealing configuration out of contact with the larger diameter splined portion of the shaft. This was accomplished by either folding the sealing lip over the outside of the seal or folding the sealing lip to the inside of the seal during installation and thereafter reversing the position of the sealing lip so that it would be in contact with the smaller diameter portion of the shaft. In such prior art seals it was necessary to severely stretch the sealing lip from its final sealing diameter to a substantially larger diameter during assembly so as to prevent the sealing lip from being damaged by the splined portion of the shaft. Also in such prior art seals the seals were pointed away and toward the control of foreign material from the smooth, smaller diameter of the shaft.

It is an object of the present invention to overcome the foregoing disadvantages and to provide a seal that is structurally pointed in the direction to keep the grease retained within the yokes and the splined area of the shaft. It is a further object of the invention to provide an annular shaft seal having a protected primary shaft sealing lip backed up with a secondary sealing lip to offer extra protection to preserve the sealing action of the primary sealing lip.

SUMMARY OF THE INVENTION

In accordance with the present invention there is provided an annular shaft seal to be moved over a first, larger diameter portion of the shaft and a seal against a second smaller diameter portion of the shaft comprising a mounting portion, a sealing lip portion and a flexible channel-shaped portion interconnecting the mounting portion and the sealing lip portion. The sealing lip portion has a primary sealing lip and an annular cam portion disposed adjacent to and spaced axially from the primary sealing lip in a direction away from the mounting portion. The sealing lip portion is movable with respect to the mounting portion, from a sealing profile in which the primary sealing lip has a smaller diameter than the annular cam portion of the seal and is adapted to be in sealing contact with the second portion of the shaft to a non-sealing profile in which the diameter of the primary sealing lip is larger than that of the cam portion of the seal, and in which the annular cam portion of the seal engages the larger diameter portion of the shaft thereby distending the primary sealing lip to its larger diameter condition such that the primary sealing lip cannot contact either portion of the shaft when the seal is being installed on the shaft, whereby the primary sealing lip is maintained out of contact with the first portion of the shaft during installation and after installation the sealing lip portion without reversal thereof automatically returns from non-sealing profile back to the sealing profile, whereby the primary sealing lip automatically moves into sealing contact with the second portion of the shaft after the annual cam portion of the seal has been moved over and beyond the first portion of the shaft to the second portion of the shaft. The annular cam portion comprises a secondary sealing lip spaced from the primary sealing lip and cooperates with the primary sealing lip in engaging the second portion of the shaft when the seal is in sealing profile.

The foregoing and other objects, features and advantages of the invention will be better understood from the following, more detailed description and appended claims.

SHORT DESCRIPTION OF THE DRAWINGS

DESCRIPTION OF SPECIFIC EMBODIMENT

Figure 1:
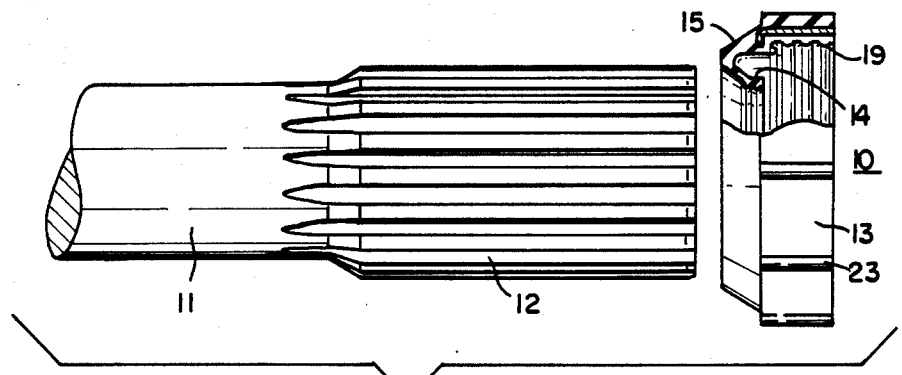
FIG. 1 is a perspective view of an annular shaft seal, partly in section, embodying the present invention and preparatory for assembly with a splined shaft.
Figure 2:
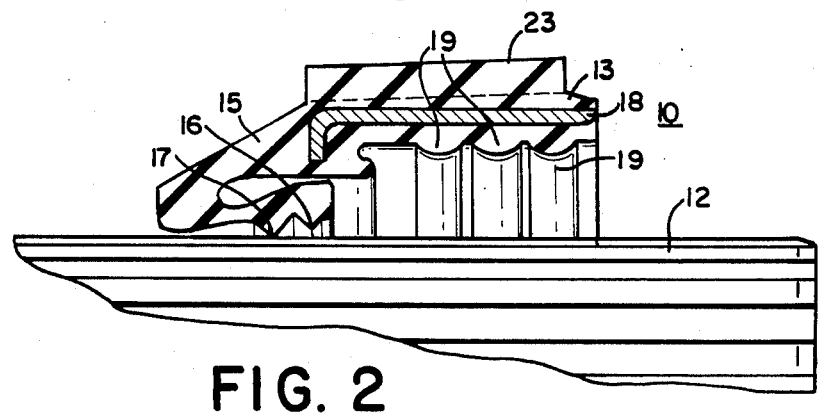
FIG. 2 shows the shaft seal of FIG. 1 on enlarged scale assembled on the splined portion of the shaft.
Figure 3:
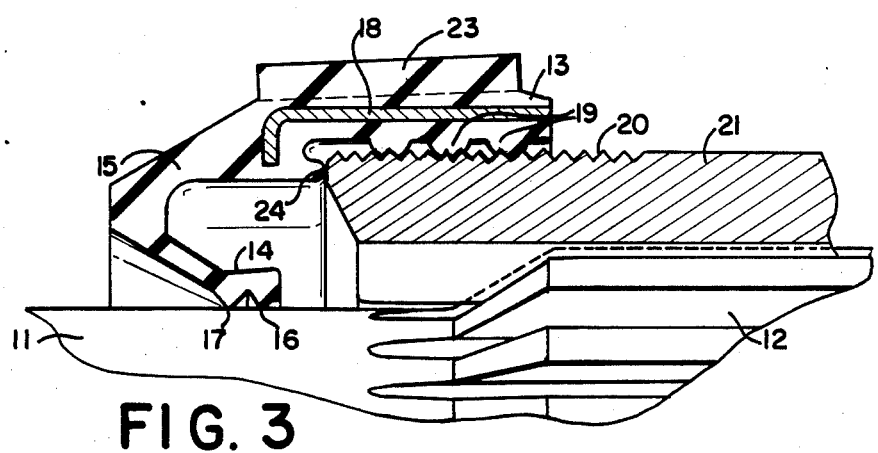
FIG. 3 is a view, partly in section, showing the seal of FIGS. 1 and 2 assembled into sealing position on the shaft.
Figure 4:
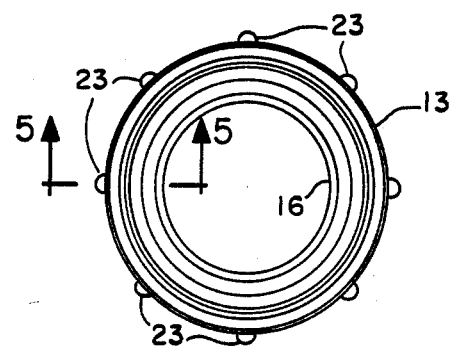
FIG. 4 is a plan view of an annular shaft seal embodying the present invention.
Figure 5:
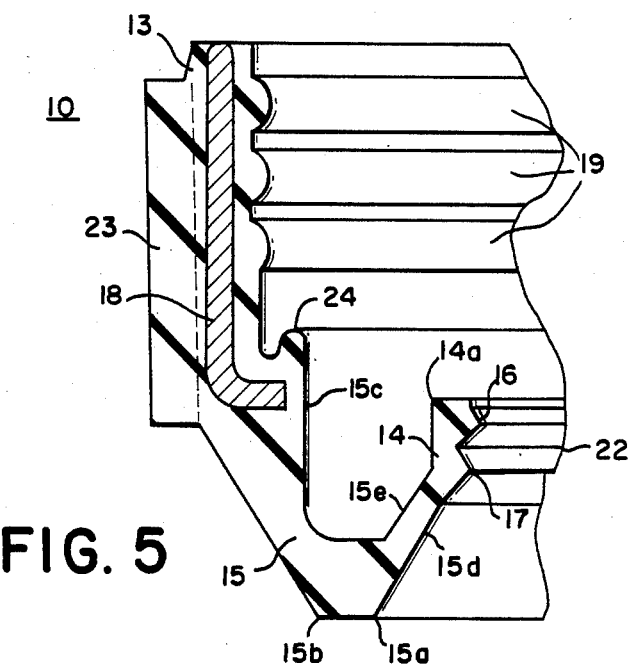
FIG. 5 is a sectional view on enlarged scale taken along the lines 5—5 in FIG. 4.

As shown in FIGS. 1-5 there is illustrated an annular shaft seal 10 embodying the present invention. FIGS. 1, 4 and 5 show the shaft seal 10 prior to its assembly with a shaft 11 in cooperation with which the seal is to be made. The shaft 11 has a larger diameter portion in the form of spline 12 over which the seal 10 must pass before it makes sealing engagement with the smaller diameter portion of the shaft 11. The annular shaft seal 10 comprises a mounting portion 13, a sealing lip portion 14 and a flexible channel-shaped portion 15 interconnecting the mounting portion 13 and the sealing lip portion 14. The sealing lip portion 14 is provided with a primary sealing lip 16 and an annular cam portion 17 disposed adjacent to and spaced axially from the primary sealing lip 16 in a direction away from the mounting portion 13. The annular cam portion 17 acts as a secondary sealing lip as later to be described.

As may be seen in FIG. 5, when the seal 10 is in its normal position the primary sealing lip 16 has a diameter smaller than the diameter of the annular cam portion 17. The sealing lip portion 14 is movable with respect to the mounting portion 13 from a sealing profile in which the primary sealing lip 16 has a smaller diameter than the annular cam portion 17 of the seal and is adapted to be in sealing contact with the second or smaller diameter portion of the shaft 11, to a non-sealing profile in which the diameter of the primary sealing lip 16 is larger than that of the annular cam portion 17 of the seal. As shown in FIG. 2 the annular cam portion 17 of the seal engages the larger diameter portion 12 of the shaft thereby distending the primary sealing lip 16 to its larger diameter condition as shown in FIG. 2 such that the primary sealing lip 16 cannot contact either portion of the shaft when the seal 10 is being installed on the shaft. Thus it will be seen from FIG. 2 that the primary sealing lip 16 is maintained out of contact with the enlarged portion 12 of the shaft during installation, and after installation, the sealing lip portion 14, without reversal thereof, automatically returns from non-sealing profile in FIG. 2, back to the sealing profile in FIG. 3. The primary sealing lip 16 automatically moves into sealing contact with the smaller diameter portion of shaft 11 after the annular cam portion 17 of the seal has been moved over and beyond the larger diameter portion or spline 12 of the shaft to the smaller diameter portion 11 of the shaft.

The annular seal 10 preferably is molded from an elastomeric material and is provided with an inner metal shell 18 to provide stiffness to the mounting portion 13. The interior of the mounting portion 13 is provided with a plurality of circular spaced ridges 19 which are adapted to cooperate with the external threads 20 on the housing 21 of the slip yoke, FIG. 3. The housing 21 is provided with a plurality of internal teeth adapted to mate with the teeth on the spline 12 on shaft 11 in a conventional manner.

As may be seen in FIG. 2 the annular cam portion 17 engages the teeth on the spline 12 while the primary sealing lip 16 is distended to its larger diameter from that shown in FIG. 4 and thus sealing lip 16 is maintained out of contact with either portion of the shaft when the seal is being installed on the shaft. When the seal 10 is moved to its fully installed position on the shaft 11 as shown in FIG. 3, the primary sealing lip 16 engages the shaft 11 thus providing an effective primary seal with the shaft 11. While the annular cam portion 17 may have been damaged to a certain extent due to its engagement with the spline 12 during installation of the seal 10, nevertheless it will provide a secondary sealing lip spaced from the primary sealing lip 16 and it cooperates with the primary sealing lip 16 in engaging the shaft 11 when the seal 10 is in sealing profile as illustrated in FIG. 3.

As may be seen in FIG. 5, the flexible channel-shaped portion 15 has a substantially V-shaped cross-section with one side of the V being connected to the mounting portion 13 and the other side of the V being connected to the sealing lip portion 14 and the closed end of the V extending away from the mounting portion 13. The side of the V connected to the sealing lip portion 14 is thinner in cross-section than the cross-section of the side of the V connected to the mounting portion 13 to provide increased flexibility for the sealing lip 14 connected thereto. The thickness of the sealing lip portion 14 is preferably less than ½ the spacing between the sides of the V at the open end thereof to permit the sealing lip portion 14 to be deflected inwardly when the annular cam portion 17 engages the spline portion 12 thereby distending the primary sealing lip 16 to the position shown in FIG. 2 where the primary sealing lip 16 cannot engage the spline portion 12 of the shaft, thus avoiding damage to the primary sealing lip 16. To further aid in this caming action the primary sealing lip 16 and the annular cam portion 17 are separated by an annular groove 22 having a bottom diameter preferably corresponding to the diameter of the second or smaller portion of the shaft 11.

In one embodiment of the invention the shaft seal 10 was adapted for use with a shaft having a smooth sealing diameter of 1.156 inches and a spline diameter of 1.375 inches. The seal was from a synthetic compound (nitrile-80 durometer) and bonded to a metal shell. The free diameter across the primary sealing lip 16 was 1.094 inches and the free diameter across the secondary sealing lip was 1.120 inches. The diameter across the bottom of the annular groove 22 was 1.156 inches corresponding to the sealing diameter of the smooth portion of the shaft 11. The inside diameter at the bottom end of the flexible channel-shaped portion 15 as indicated at 15a was 1.38 inches which is slightly larger than the diameter of the spline 12 of the shaft and thus does not interfere with the spline when the seal is installed on the shaft. The outside diameter at the bottom end of the channel-shaped portion 15 as indicated at 15b had a diameter of 1.53 inches. The sealing lip portion at 14a had a diameter of 1.220 inches. The flexible channel-shaped portion at 15c had a diameter of 1.562 inches. The outer surface 15d of the channel-shaped portion had an angle of 60° with the horizontal whereas the inner surface 15e had an angle of 55° with the horizontal. The exterior of the mounting portion 13 was provided with a plurality of spaced finger tabs 23 to facilitate screwing the seal 10 onto the threads 20 of the housing 21 shown in FIG. 3. When the seal 10 is installed in sealing position, the end of the housing 21 is adapted to engage the end seal projection 24 as shown in FIG. 3.

While a preferred embodiment of the invention has been described and illustrated herein, it is to be understood that further modifications may be made in accordance with the scope of the appended claims.

What is claimed is:

1. An annular shaft seal to be moved over a first, larger diameter portion of a shaft and to seal against a second, smaller, diameter portion of the said shaft, comprising a mounting portion, a sealing lip portion, and a flexible channel-shaped portion interconnecting said mounting portion and said sealing lip portion, said sealing lip portion having a primary sealing lip and an annular cam portion disposed adjacent to and spaced axially from said primary sealing lip in a direction away from said mounting portion, said sealing lip portion being movable with respect to said mounting portion, from a sealing profile in which said primary sealing lip has a smaller diameter than said annular cam portion of said seal and is adapted to be in sealing contact with said second portion of said shaft, to a non-sealing profile in which the diameter of said primary sealing lip is larger than that of said annular cam portion of said seal, and in which said annular cam portion of said seal engages said larger diameter portion of the shaft thereby distending said primary sealing lip to its larger diameter condition such that said primary sealing lip cannot contact either portion of said shaft when said seal is being installed on said shaft, whereby said primary sealing lip is maintained out of contact with said first portion of said shaft during installation and after installation said sealing lip portion without reversal thereof automatically returns from non-sealing profile back to said sealing profile, whereby said primary sealing lip automatically moves into sealing contact with said second portion of said shaft after said annular cam portion of said seal has been moved over and beyond said first portion of said shaft to said second portion of said shaft.

2. An annular shaft seal according to claim 1 wherein said flexible channel-shaped portion has a substantially V-shaped cross-section with one side of the V being connected to said mounting portion and the other side of the V being connected to said sealing lip portion and the closed end of the V extending away from said mounting portion.

3. An annular shaft seal according to claim 2 wherein said primary sealing lip and said annular cam portion are separated by an annular groove.

4. An annular shaft seal according to claim 2 wherein the side of said V connected to said sealing lip portion is thinner in cross-section than the cross-section of the side of the V connected to said mounting portion to provide increased flexibility for said sealing lip portion connected thereto.

5. An annular shaft seal according to claim 4 wherein the thickness of the sealing lip portion is less than one-half the spacing between the sides of the V at the open end thereof.

6. An annular shaft seal according to claim 5 wherein said primary sealing lip and said annular cam portion are separated by an annular groove, said annular groove having a bottom diameter corresponding to the diameter of said second portion of said shaft.

7. An annular shaft seal according to claim 1 molded from an elastomeric material and wherein said mounting portion has embedded therein an annular metal shell.

8. An annular shaft seal according to claim 7 wherein said mounting portion includes a plurality of annular grooves and ridges for mounting said annular shaft seal with said sealing lip in sealing contact with said second portion of said shaft.

9. An annular shaft seal according to claim 1 wherein said flexible channel-shaped portion has an inside diameter at the bottom end thereof greater than the diameter of said first portion of said shaft.

10. An annular shaft seal according to claim 1 wherein said annular cam portion comprises a secondary sealing lip spaced from said primary sealing lip and cooperates with said primary sealing lip in engaging said second portion of said shaft when said seal is in sealing profile.

11. An annular shaft seal according to claim 1 wherein said primary sealing lip and said annular cam portion are separated by an annular groove.

12. A method of installing an annular shaft seal over a first, larger diameter portion of a shaft and to seal against a second, smaller, diameter portion of the shaft, the seal comprising a mounting portion, a sealing lip portion, and a flexible channel-shaped portion interconnecting said mounting portion and said sealing lip portion, the sealing lip portion having a primary sealing lip and an annular cam portion disposed adjacent to and spaced axially from the primary sealing lip in a direction away from the mounting portion, the sealing lip portion being movable with respect to the mounting portion, from a sealing profile in which the primary sealing lip has a smaller diameter than the annular cam portion of the seal and is adapted for sealing contact with the second portion of the shaft, to a non-sealing profile in which the diameter of the primary sealing lip is larger than that of the annular cam portion of the seal, said method comprising the steps of moving the annular cam portion of the seal into engagement with the larger diameter portion of the shaft thereby distending the primary sealing lip to its larger diameter condition such that the primary sealing lip cannot contact either portion of the shaft when the seal is being installed on the shaft, whereby the primary sealing lip is maintained out of contact with the first portion of the shaft during installation, and further moving the annular cam portion of the seal in the same direction off the larger diameter portion of the shaft without reversal thereof automatically to return the sealing lip portion from non-sealing profile back to the sealing profile, whereby the primary sealing lip automatically moves into sealing contact with the second portion of the shaft after the annular cam portion of the seal has been moved over and beyond the first portion of the shaft to the second portion of the shaft.

13. An annular shaft seal to be moved over a first, larger diameter portion of a shaft and to seal against a second, smaller, diameter portion of the said shaft, comprising a mounting portion, a sealing lip portion, and a flexible channel-shaped portion interconnecting said mounting portion and said sealing lip portion, said sealing lip portion having a primary sealing lip and a secondary sealing lip disposed adjacent to and spaced axially from said primary sealing lip in a direction away from said mounting portion, said sealing lip portion being movable with respect to said mounting portion, from a sealing profile in which said primary sealing lip has a smaller diameter than said secondary sealing lip and is adapted to be in sealing contact with said second portion of said shaft, to a non-sealing profile in which the diameter of said primary sealing lip is larger than that of said secondary sealing lip, and in which said secondary sealing lip engages said larger diameter portion of the shaft thereby distending said primary sealing lip to its larger diameter condition such that said primary sealing lip cannot contact either portion of said shaft when said seal is being installed on said shaft, whereby said primary sealing lip is maintained out of contact with said first portion of said shaft during installation and after installation said sealing lip portion without reversal thereof automatically returns from non-sealing profile back to said sealing profile, whereby said primary sealing lip automatically moves into sealing contact with said second portion of said shaft after said secondary sealing lip has been moved over and beyond said first portion of said shaft to engage said second portion of said shaft.

* * * * *